US012662853B2

(12) United States Patent
Hunt et al.

(10) Patent No.: US 12,662,853 B2
(45) Date of Patent: Jun. 23, 2026

(54) ELECTROMOTIVE DRIVE UNIT FOR MOTOR VEHICLE APPLICATIONS

(71) Applicant: KIEKERT AKTIENGESELLSCHAFT, Heiligenhaus (DE)

(72) Inventors: Robert J. Hunt, Davisburg, MI (US); Scott Brown, Livonia, MI (US); Thorsten Bendel, Oberhausen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 30 days.

(21) Appl. No.: 18/903,284

(22) Filed: Oct. 1, 2024

(65) Prior Publication Data

US 2026/0092478 A1 Apr. 2, 2026

(51) Int. Cl.

*E05B 81/20* (2014.01)
*E05B 79/20* (2014.01)
*E05B 81/04* (2014.01)

(52) U.S. Cl.

CPC .............. *E05B 81/20* (2013.01); *E05B 79/20* (2013.01); *E05B 81/04* (2013.01)

(58) Field of Classification Search

CPC ........... E05B 81/20; E05B 81/04; E05B 79/20
USPC ............................................................ 70/277
See application file for complete search history.

(56) References Cited

U.S. PATENT DOCUMENTS

| | | | | |
|---|---|---|---|---|
| 6,023,993 A * | 2/2000 | Beugelsdyk | F16C 1/262 74/502.6 |
| 6,530,251 B1 * | 3/2003 | Dimig | E05B 79/20 70/237 |
| 9,540,854 B2 * | 1/2017 | Graute | E05B 79/02 |
| 9,810,004 B2 * | 11/2017 | Scholz | E05B 81/20 |
| 2014/0049056 A1 * | 2/2014 | Scholz | E05B 85/243 292/200 |

(Continued)

FOREIGN PATENT DOCUMENTS

| | | | |
|---|---|---|---|
| BR | 112018071732 A2 * | 4/2020 | F16C 1/14 |
| DE | 202008015789 U1 | 4/2010 | |
| DE | 102011012656 A1 | 8/2012 | |

(Continued)

OTHER PUBLICATIONS

International Search Report and Written Opinion for corresponding Application No. PCT/US2025/045477, issued Jan. 27, 2026.

*Primary Examiner* — Nathan Cumar
(74) *Attorney, Agent, or Firm* — Renner, Otto, Boisselle & Sklar, LLP

(57) ABSTRACT

An electromotive drive unit is provided for motor vehicle applications, in particular a closing drive for a motor vehicle lock, preferably a motor vehicle door lock. For this purpose, the drive unit is provided with an electromotive drive and a Bowden cable. The Bowden cable couples the electromotive drive to an actuating element acted upon thereby. The Bowden cable is supported with its sheath on a housing accommodating the actuating element and works with its core on the actuating element. According to the invention, the core has a front hook which engages over a bevel of the actuating element. In this way, in order to interrupt a pulling action on the actuating element, the hook only has to be released from the bevel.

11 Claims, 3 Drawing Sheets

(56) References Cited

U.S. PATENT DOCUMENTS

| | | | | |
|---|---|---|---|---|
| 2016/0177602 A1* | 6/2016 | Graute | .................... | E05B 81/20 74/424.71 |
| 2020/0181954 A1* | 6/2020 | Hwang | .................. | B62D 25/12 |

FOREIGN PATENT DOCUMENTS

| | | | |
|---|---|---|---|
| DE | 202012010338 | U1 | 2/2014 |
| EP | 3037683 | B1 | 7/2019 |
| JP | H0650046 | A | 2/1994 |

* cited by examiner

ELECTROMOTIVE DRIVE UNIT FOR MOTOR VEHICLE APPLICATIONS

FIELD OF DISCLOSURE

The invention relates to an electromotive drive unit for motor vehicle applications, in particular a closing drive for a motor vehicle lock, preferably a motor vehicle door lock, comprising an electromotive drive and a Bowden cable which couples the electromotive drive to an actuating element acted upon thereby, i.e., by the electromotive drive, the Bowden cable being supported with its sheath on a housing which accommodates the actuating element and working with its core on the actuating element.

BACKGROUND OF DISCLOSURE

Electromotive drive units for motor vehicle applications are used in a variety of ways in or on motor vehicles. For example, such an electromotive drive unit can be used to carry out a seat or mirror adjustment. It can also be used to create and implement a window lift drive, a door drive for a sliding door, a tailgate, etc. In addition, such electromotive drives are used, for example, to lock and unlock front hoods, charging sockets, fuel tank flaps, etc., to name just a few distinctive examples. In this context, the electromotive drive is usually provided with a Bowden cable, which in turn moves the actuating element to be acted upon by the electromotive drive. In the case of a window lift drive, the actuating element can be a window pane that can be raised and lowered. The actuating element can also be designed as a mirror for a mirror adjustment.

Particularly preferred are closing drives for a motor vehicle lock. With the aid of such a closing drive, a locking mechanism consisting substantially of a rotary latch and a pawl is typically acted upon in the housing inside the motor vehicle lock. For this purpose, the Bowden cable works, for example, on the rotary latch as a component of the locking mechanism, as described in detail in the generic prior art according to EP 3 037 683 B1.

For this purpose, the electromotive drive is arranged spatially and functionally separately from a lock housing which accommodates the locking mechanism. The desired closing movement for the rotary latch inside the lock housing is transmitted via the Bowden cable which couples the electromotive drive to the lock housing. This means that the locking mechanism or its rotary latch arranged inside the housing or lock housing functions as an actuating element or a part thereof, which is subjected to a pulling action in particular by means of the core inside the sheath of the Bowden cable. This allows the rotary latch to be moved by motor from a previously assumed pre-locking position to a main locking position. This has proven to be fundamentally successful.

However, during such closing movements blockages of the rotary latch and/or the electromotive drive may be observed. Such blockages are possible, for example, if a coat or an object in general becomes trapped in a gap between a motor vehicle door which accommodates the motor vehicle lock and the surrounding motor vehicle body. It is also conceivable that the rotary latch is blocked in another way during its closing movement.

For this purpose, the further and generic prior art according to DE 10 2011 012 656 A1 discloses an ejector lever with the aid of which a closing pawl as a component of the closing drive is ejected. This mechanically interrupts the closing drive and can open the locking mechanism. This allows any blockages to be released, which has generally proven to be effective.

In this context, the latter prior art according to DE 10 2011 012 656 A1 makes it clear that the mechanical and structural design of such a closing drive including the ejector lever is complex and therefore costly. In addition to the ejector lever mentioned above, an opening transmission lever is also provided here which is used to act upon the closing pawl for ejection. This ensures that the required and desired functionality is achieved. However, there is a need to reduce complexity and therefore costs. This is where the invention steps in.

SUMMARY OF DISCLOSURE

The invention is based on the technical problem of further developing such an electromotive drive unit for motor vehicle applications and in particular a closing drive for a motor vehicle lock in such a way that the design effort and thus also the costs are reduced while maintaining unchanged functional reliability and still allowing for the possibility of interrupting a closing process.

To solve this technical problem, the invention proposes, in a generic electromotive drive unit for motor vehicle applications and in particular a closing drive for a motor vehicle lock and preferably a motor vehicle door lock, that the core of the Bowden cable has a front hook which engages over a bevel of the actuating element, so that, in order to interrupt a pulling and/or pushing action on the actuating element, the hook only has to be released from the bevel.

The invention is based on the understanding that a tensile or thrust force can easily be exerted on the actuating element using the core. This is because the sheath, as a further component of the Bowden cable, is supported on the housing, which accommodates the actuating element. This allows the core to transfer tensile forces (thrust forces) from the electromotive drive to the actuating element. Most of the time, tensile forces and thus a pulling action are observed.

If a blockage occurs during such a pulling action, then, in contrast to the prior art according to DE 10 2011 012 656 A1, no complex mechanical constructions with ejector levers and opening transmission levers are required. Rather, according to the invention it is sufficient if the hook mechanically connected thereto on the front side of the core is released from the bevel as a component of the actuating element. This means that the actuating element is provided with a bevel.

As a rule, this bevel is found on a closing pawl or a closing lever coupled to the closing pawl. This means that the actuating element is typically designed in multiple parts. In the event that the present invention relates to a closing drive for a motor vehicle lock and preferably a motor vehicle door lock, the actuating element is composed in detail and by way of example of a rotary latch as a component of a locking mechanism comprising a rotary latch and pawl, the closing pawl and the closing lever. In principle, the closing lever and the closing pawl can also fit into one another.

In any case, the aforementioned actuating element has the bevel which is engaged over by the hook on the core of the Bowden cable in the assembled or functional state. This makes it possible to interrupt the closing process in a particularly simple yet functional way. For this purpose, it is sufficient if the hook which engages over the bevel of the actuating element is released from the bevel. As a result, in the example described, the closing lever with the connected closing pawl is released from its engagement with the rotary latch, so that the rotary latch can then open in a spring-assisted manner.

For this purpose and according to an advantageous embodiment, a release lever is provided for the hook, which release lever ensures that the hook is released from the bevel. The release lever can be acted upon mechanically and/or by an electric motor.

In addition, the release lever generally ensures that the hook is acted upon mostly transversely to its longitudinal extension. In detail, the hook is provided with a run-up slope and a stop. In conjunction with an assembly process of the Bowden cable on the actuating element, the run-up slope ensures that the hook can be guided through an opening in the housing and then slides past the bevel with its run-up slope until the stop, as a further component of the hook, has passed the bevel and subsequently engages over the bevel. This may be additionally supported by a spring.

In this way, the design is usually such that the hook rests with its stop on the bevel when in the functional state. Here, it has also proven to be particularly advantageous if the stop and the bevel largely run parallel to one another or span planes which are oriented parallel to one another and lie against one another in the functional state.

The hook can be attached to the core in various ways. It has proven to be particularly advantageous if the hook is designed as a stamped part and in particular as a metal stamped part. This makes the hook particularly easy and cost-effective to produce and implement. In this context, it is also suggested that the hook and the core are detachably connected to one another. This also makes it easy to dismantle the hook and thus the Bowden cable from the actuating element. All that is required is to remove or compress a passage for the sheath of the Bowden cable through an opening in the housing, so that the core can then be removed from the housing through the opening using the hook attached thereto on the front.

A similar procedure can also be used if the hook and the core are integrally formed. In this case, it is conceivable that the hook is molded onto the core using a plastics injection molding process. Other fastening options between the hook and core are of course also conceivable, for example by crimping, locking or even gluing.

The result is an electromotive drive unit for motor vehicle applications and in particular a closing drive for a motor vehicle lock that has a strikingly simple mechanical design and can be easily ejected in the event of a blockage. Complicated ejector mechanisms are expressly avoided. Rather, the hook provided on the front of the core of the Bowden cable functions as an ejector in conjunction with the associated release lever, in that the hook is acted upon transversely to its longitudinal extension in order to thereby release it from its contact with the edge of the actuating element. These are the main advantages.

BRIEF DESCRIPTION OF DRAWINGS

The invention is explained in greater detail below with reference to drawings which show only one exemplary embodiment. In the drawings.

DETAILED DESCRIPTION

Figure 1:
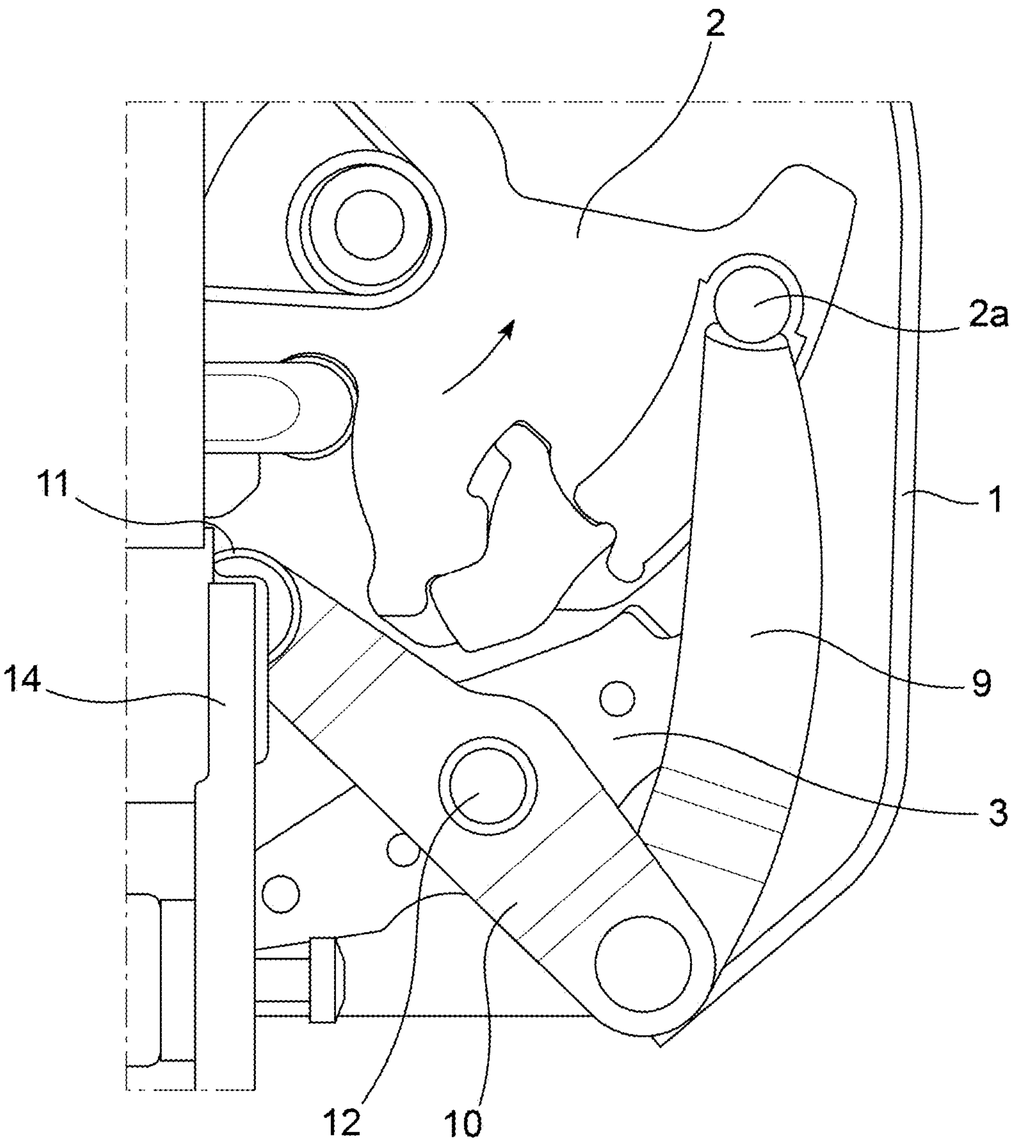
FIG. 1 shows an electromotive drive unit for motor vehicle applications in the form of a closing drive for a motor vehicle door lock.

FIG. 1 shows an electromotive drive unit for motor vehicle applications. This is, in the present case and not in any restrictive manner, a closing drive for a motor vehicle door lock. For this purpose, the motor vehicle door lock is provided with a housing or lock housing 1. In the housing or lock housing 1, a locking mechanism 2, 3 consisting substantially of a rotary latch 2 and a pawl 3 is rotatably mounted and is accommodated in the housing 1. In this context, the rotary latch 2 functions as a substantial component of an actuating element 2; 9, 10, 11, which is acted upon by means of an electromotive drive 4 or carries out actuating movements. The actuating element 2; 9, 10, 11 according to the embodiment is not only composed of the rotary latch 2, but also of a closing pawl 9 working on the rotary latch 2 and two closing levers 10, 11, which will be examined in more detail below.

Figure 3:
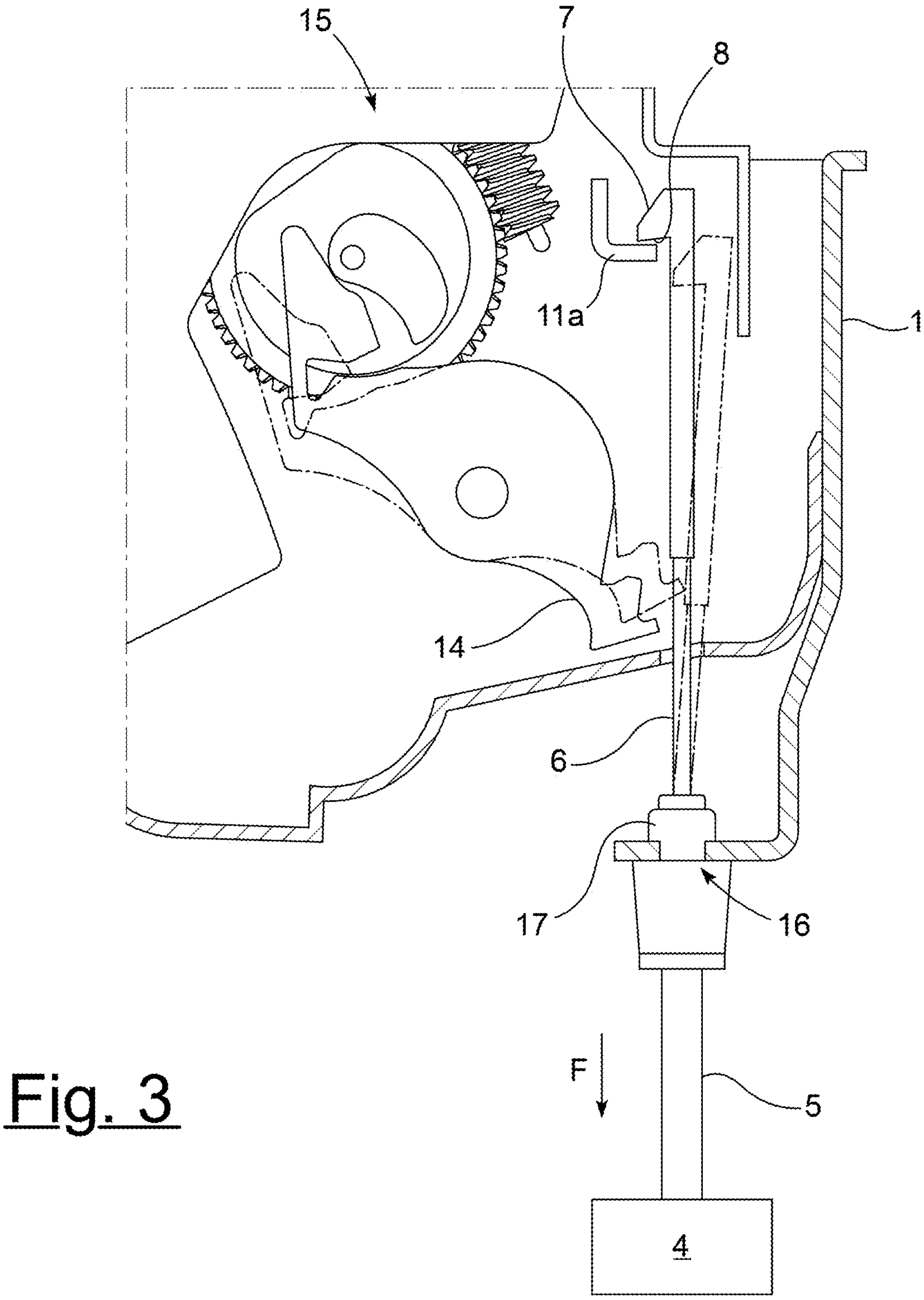
FIG. 3 shows the object according to FIG. 1 in a different view during an ejection process.

According to FIG. 3, the electromotive drive 4 can be seen in particular in the side view of the object shown in front view in FIG. 1. The electromotive drive 4 may be provided with a downstream gear, with the aid of which a linear movement is exerted on a Bowden cable 5, 6. Examples of the specific design of the electromotive drive 4 with electric motor and gear can be found in the two documents previously referred to as prior art and the prior art referred to therein.

The Bowden cable 5, 6 itself is composed of a sheath 5 and a core 6. As is customary, the sheath 5 surrounds the core 6, which can move linearly therein. In addition, the design is such that the Bowden cable 5, 6 with its sheath 5 is supported on the housing or lock housing 1 which accommodates the actuating element 2; 9, 10, 11.

With the aid of the electromotive drive 4, pulling movements in the direction of the force F are now typically exerted on the core 6 of the Bowden cable 5, 6. This is possible because the sheath 5 of the Bowden cable 5, 6 is supported between the housing or lock housing 1 and a merely indicated or an existing housing of the electromotive drive 4. A corresponding pulling movement on the core 6 and consequently the tensile force F is now transmitted to the actuating element 2; 9, 10, 11 and specifically to one of the two closing levers 10, 11 by means of a front hook 7, 8. This corresponds to an action on the rotary latch 2 as a substantial element in such a way that the rotary latch 2 in the illustration according to FIG. 1 is pivoted about its axis in the counterclockwise direction indicated there.

According to the invention and of particular importance is not only the fact that the core 6 of the Bowden cable 5, 6 is provided with the aforementioned front hook 7, 8, rather, in the functional state shown in particular in FIG. 3, this hook 7, 8 engages over a bevel 11*a* of the actuating element 2; 9, 10, 11. The bevel 11*a* of the actuating element 2; 9, 10, 11 according to the embodiment is found on the associated (second) closing lever 11.

The overall design as shown in FIG. 1 is such that the actuating element 2; 9, 10, 11 has the rotary latch 2 as a substantial component. For this purpose, the rotary latch 2 has a stop bolt 2*a* that projects vertically from the plane of the drawing in FIG. 1. In order to close the rotary latch 2, the closing pawl 9 rests on the stop bolt 2*a* in question.

In addition, the closing pawl 9 is rotatably connected to the first closing lever 10. The closing lever chain 9, 10, 11 implemented in this way can be pivoted about a common axis 12 as shown in detail in FIG. 2. The axis 12 is defined by a bearing bolt 12 anchored in the housing or lock housing 1.

Figure 2:
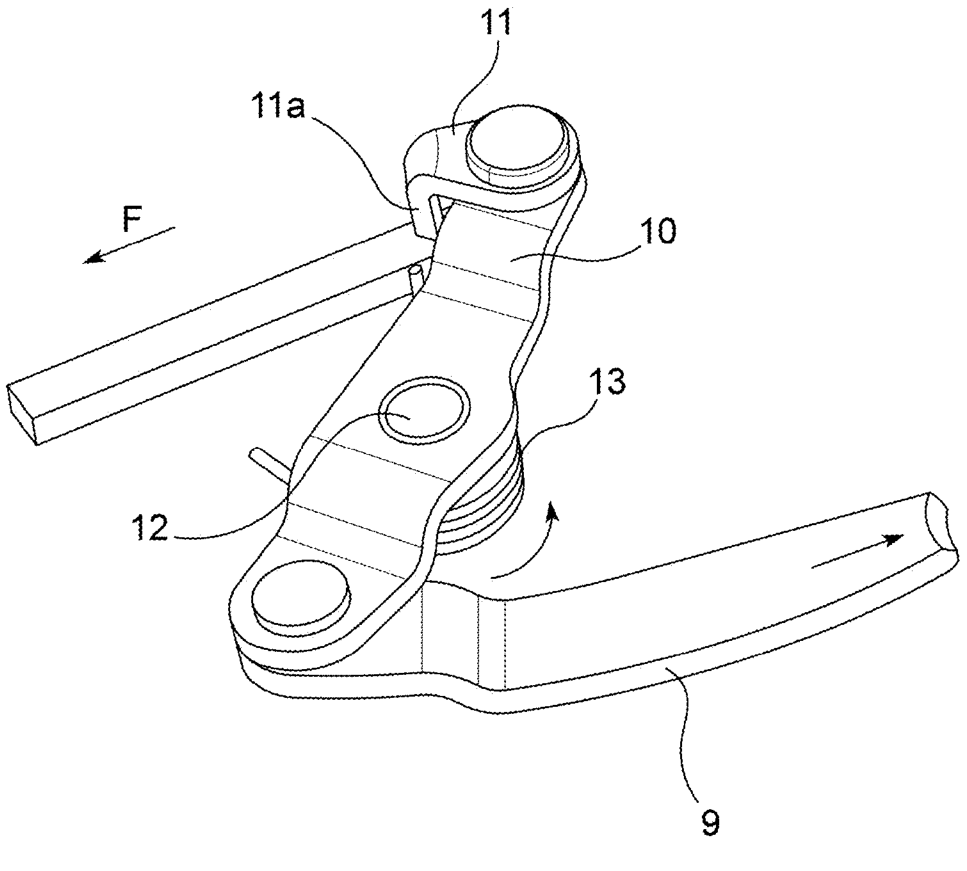
FIG. 2 shows the actuating element in a separate illustration.

The second closing lever 11 with the aforementioned bevel 11*a* is also rotatably connected to the first closing lever 10, as is the closing pawl 9. The second closing lever 11 and the closing pawl 9 are each located at opposite ends of the first closing lever 10, which can be rotated about the axis 12 and is designed as a two-arm lever for this purpose. In FIG. 2, as soon as a pulling movement or the tensile force F is exerted on the bevel 11*a* of the second closing lever 11 in the direction shown in FIG. 2 by means of the core 6 of the Bowden cable 5, this tensile force F causes the first closing lever 10 to be pivoted about the axis 12 in the counterclockwise direction indicated in FIG. 2. This means that the closing pawl 9, which is pivotally connected to the end opposite the second closing lever 11, performs a predominantly linear movement in the direction of the arrow indicated in FIG. 2.

This linear movement of the closing pawl 9, in conjunction with the stop bolt 2*a* of the rotary latch 2, ensures that the rotary latch 2 completes the counterclockwise movement about its axis in a closing direction as indicated in FIG. 1. All this happens against the force of a spring 13, which is tensioned during this process.

A further substantial component is a release lever 14, which can be seen in FIG. 3. The release lever 14 is in turn acted upon by means of an electromotive drive, which is provided with the reference sign 15. In principle, however, the release lever 14 can also be acted upon mechanically, or both mechanically and by electric motor.

In either case, the mechanical and/or electromotive action upon the release lever 14, which can be seen in FIG. 3, results in the release lever 14 being moved "to the right" in the illustration according to FIG. 3. During this process, the release lever 14 moves against the hook 7, 8 or the core 6 of the Bowden cable 5 carrying the front hook 7, 8. As a result, the hook 7, 8 is largely subjected to pressure transversely to its longitudinal extension, as can be seen from the functional state of the hook 7, 8 shown in solid lines in comparison to the ejected state of the hook 7, 8, which is shown in dash-dotted lines.

The hook 7, 8 is in turn provided with the run-up slope 7 and the stop 8. The run-up slope 7 ensures that the hook 7, 8, when inserted into an opening 16 of the housing 1, first runs along the bevel 11*a* of the actuating element 2; 9, 10, 11, and specifically of the second closing lever 11, and then engages over the bevel 11*a* in question.

As a result, the hook 7, 8 or its stop 8 rests on the bevel 11*a* in the functional state shown in solid lines. In addition, the design is such that the stop 8 and the bevel 11*a* in question run largely parallel to one another. In the context of the embodiment, the hook 7, 8 is a stamped part and in particular a metal stamped part, which can be manufactured particularly easily and inexpensively.

The core 6 of the Bowden cable 5 may be detachably or integrally connected to the hook 7, 8 in question. There are various options for coupling which are mentioned in detail in the introduction to the description. The sheath 5 of the Bowden cable 5, 6 is provided with a feedthrough or grommet 17. According to the embodiment, the feedthrough or grommet 17 is inserted into the opening 16 of the housing or lock housing 1. In addition, the spring 13 as a whole ensures that the stop 8 rests against the bevel 11*a* in the functional state shown in solid lines.

As soon as a possible blockage of the closing drive described in detail is observed during a closing process of the rotary latch 2 in the example case, the closing process can be immediately interrupted via the motorized or manually operated release lever 14. For this purpose, the release lever 14 moves against the hook 7, 8 transversely to its longitudinal extension. In this way, the stop 8 as a component of the hook 7, 8 is released from the bevel 11*a*, so that the rotary latch 2 can then swing open in the example case in a spring-assisted manner and any blockages are avoided.

LIST OF REFERENCE SIGNS

1 Lock housing
2 Actuating element, rotary latch
2*a* Bolt
4 Electromotive drive
5 Bowden cable
6 Bowden cable, core
7 Hook, run-up slope
8 Hook, stop
9 Actuating element, closing pawl
10 Actuating element, first closing lever
11 Actuating element, second closing lever
11*a* Bevel
12 Axis, bearing bolt
13 Spring
14 Release lever
15 Electromotive drive
16 Housing opening
17 Grommet
F Tensile force

The invention claimed is:

1. An electromotive drive unit for motor vehicle applications comprising:

an electromotive drive and an actuating element, a housing that accommodates the actuating element, a Bowden cable which couples the electromotive drive to the actuating element acted upon thereby, the Bowden cable being supported with a sheath of the Bowden cable being supported on the housing which accommodates the actuating element and working with a core of the Bowden cable on the actuating element, wherein the core has a front hook which engages over a bevel of the actuating element, so that in order to interrupt a pulling and/or pushing action on the actuating element, the hook and the core are released from the bevel, and a release lever for releasing the hook from the bevel by directly acting on the hook.

2. The electromotive drive unit according to claim 1, wherein the release lever directly acts on the hook mechanically and/or by an electric motor.

3. The electromotive drive unit according to claim 1, wherein the release lever directly acts on the hook transversely to a longitudinal extension on the hook.

4. The electromotive drive unit according to claim 1, wherein the hook is provided with a run-up slope and a stop.

5. The electromotive drive unit according to claim 4, wherein the hook rests with the stop on the bevel in a functional state in which the hook and the bevel are engaged.

6. The electromotive drive unit according to claim 5, wherein the stop and the bevel run parallel to one another.

7. The electromotive drive unit according to claim 1, wherein the hook is designed as a metal stamped part.

8. The electromotive drive unit according to claim 1, wherein the hook and the core are detachably connected to one another.

9. The electromotive drive unit according to claim 1, wherein the hook and the core are integrally connected to one another.

10. The electromotive drive unit according to claim 1, wherein the actuating element is a motor vehicle door lock comprising a rotary latch and a pawl, and the bevel is provided on the pawl.

11. The electromotive drive unit according to claim 1, wherein the actuating element is a motor vehicle door lock comprising a rotary latch, a pawl, and a closing lever that engages with the pawl, and the bevel is provided on one of the closing lever or the pawl.

* * * * *